United States Patent [19]

Anderson

[11] 4,043,963
[45] Aug. 23, 1977

[54] HEAT-HARDENABLE AQUEOUS EPOXY EMULSIONS CONTAINING AMINOPLAST RESIN

[75] Inventor: Ronald W. Anderson, Pittsburgh, Pa.

[73] Assignee: Mobil Oil Corporation, New York, N.Y.

[21] Appl. No.: 656,504

[22] Filed: Feb. 9, 1976

[51] Int. Cl.$^2$ .............................................. C08L 63/02
[52] U.S. Cl. ....................... 260/29.4 R; 260/29.2 EP; 428/418
[58] Field of Search .................. 260/29.4 R, 29.2 EP, 260/834; 428/418

[56] References Cited

U.S. PATENT DOCUMENTS

| | | | |
|---|---|---|---|
| 2,681,322 | 6/1954 | Auer | 260/29.4 R X |
| 3,137,667 | 6/1964 | Gassmann et al. | 260/29.4 |
| 3,153,003 | 10/1964 | O'Brien | 260/29.4 |
| 3,320,197 | 5/1967 | Enders | 260/29.2 |
| 3,598,775 | 8/1971 | Huggard | 260/18 |

*Primary Examiner*—Theodore E. Pertilla
*Attorney, Agent, or Firm*—Charles A. Huggett

[57] ABSTRACT

A thermally curable aqueous emulsion coating composition is provided in which the discontinuous phase of the emulsion is constituted by liquid particles of a mixture of resinous polyepoxide and 2-hexoxy ethyl ether of an aminoplast resin, dissolved in an essentially water immiscible organic solvent. A surfactant, which is preferably nonionic, is used to stably suspend the liquid particles in the aqueous continuum. The etherification of the aminoplast resin with 2-hexoxy ethanol serves to provide improved retention of cure capacity on storage.

11 Claims, No Drawings

HEAT-HARDENABLE AQUEOUS EPOXY EMULSIONS CONTAINING AMINOPLAST RESIN

The present invention relates to heat hardenable coating compositions which are aqueous epoxy emulsions including an aminoplast resin for cure.

Epoxy emulsions including an aminoplast curing agent have desirable properties, but difficulties are encountered when the aminoplast curing agent is incorporated into the emulsified epoxy resin droplets to provide an intimate admixture of the two resins prior to coating. Unfortunately, when the aminoplast resin is combined with the epoxy resin in the same emulsified droplets, the emulsion exhibits inadequate storage stability from the standpoint that the cure capacity of the emulsion degrades with time. This inadequacy is conveniently measured by the decrease in pasteurization blush resistance which takes place when the emulsion is stored for an extended period prior to use.

In accordance with this invention, it has been found that when a portion of the N-methylol groups in the aminoplast resin are etherified with 2-hexoxy ethanol, the curing characteristics of the resin remain essentially unaltered, but the cure stability of aqueous epoxy emulsions containing the etherified aminoplast in direct admixture with the epoxy resin is significantly improved. Moreover, and despite the presence of the hydrophobic hexyl terminal group, the partially etherified aminoplast resin remains stably emulsifiable in water and curable at the same moderate temperatures heretofore used for the conventional aminoplast resins. Both resins are dissolved in an organic solvent which is essentially water immiscible (limited miscibility can be tolerated so long as the solvent is used in an amount which is immiscible) and the solution is emulsified into water with the aid of a surfactant which is preferably nonionic.

At least about 5% of the N-methylol groups should contain the 2-hexoxy ethyl ether groups in order to provide a noticeable improvement, but etherification is desirably as high as possible to maximize cure stability. The remaining N-methylol groups in the aminoplast resin may be unetherified, or they may be etherified with a less volatile alcohol, such as a $C_1 - C_4$ alkanol. Some etherification with lower ether alcohols, such as a $C_1 - C_4$ alkyl monoether of ethylene glycol can also be tolerated.

Etherification is conveniently carried out by refluxing the aminoplast resin which is already at least partially etherified with a more volatile alcohol, such as butanol, to produce a transetherification which insures that the more reactive sites on the aminoplast are etherified with 2-hexoxy ethanol. If aromatic or other solvents are stripped off, the transetherification will occur automatically when 2-hexoxy ethanol is added before or during the stripping operation which removes or reduces the proportion of the undesired solvents, e.g., the aromatic solvent. In this way, a separate etherification operation can be avoided when the solvent already present is partially or wholly removed.

This invention preferably employs a urea-formaldehyde resin since these are stable at the lowest levels of 2-hexoxy ethanol etherification. However, other aminoplast resins can be used, such as melamine and benzoguanamine, which have been reacted with formaldehyde to provide a solvent soluble heathardening resin.

The best essentially water immiscible solvent for emulsion stability is 2-hexoxy ethanol, but other solvents which are poorly miscible in water (essentially water immiscible) are also useful, such as butanol and 2-ethyl hexanol. Xylol is also useful, but the aliphatic solvents are less obnoxious and have better wetting properties so it is desired to minimize the use of the aromatic solvents.

The epoxy emulsions used in this invention have a water continuum and the discontinuous phase is constituted by liquid particles of a mixture of epoxy resin and aminoplast resin, these two resins being dissolved in an essentially water immiscible organic solvent and the solution emulsified into the water continuum using a surfactant which is preferably nonionic.

Any resinous polyepoxide which can be dissolved in an organic solvent of limited water solubility so as to be emulsifiable into an aqueous medium by means of a surfactant may be used. Appropriate solvents are well known in the existing emulsions which lack desired cure stability. Solid resinous polyepoxides are particularly preferred, and diglycidyl ethers of bisphenols, especially those having a 1,2-epoxy equivalency of about 1.4 to about 2.0 are particularly contemplated. The well known Shell commercial resin Epon 1007 (epoxide equivalent weight of 2000–2500) is illustrative and is used in the test formulation set forth in the Table hereinafter. These solid epoxy resins are dissolved in the organic solvent to form a viscous solution.

The resinous polyepoxides which are useful may have a molecular weight in the range of about 350 to about 8000, but the normally solid diepoxides having a molecular weight of from about 400 to about 6000 are preferred.

While any conventional surfactant is broadly useful, it is preferred to employ nonionic surfactants, and these are normally used in an amount of from 0.5–20%, preferably from 5–15% on the total weight of resin (the polyepoxide and the etherified aminoplast).

Many nonionic surfactants are available, but the ethylene oxide adducts of hydrophobic organic compounds containing one or more active hydrogen atoms are preferred. Various suitable hydrophobes are available, such as octyl or nonyl phenol, alcohols containing from 8–22 carbon atoms, and polyoxypropylene. The ethylene oxide is adducted on to provide from 3 or more, up to about 80 mols of ethylene oxide per mol of the hydrophobe.

It is particularly preferred to employ a polyoxyethylene derivative of a polyoxypropylene hydrophobe.

The aminoplast modified epoxy emulsions may vary in the proportion of the aminoplast resin. In this invention, the aminoplast resin may be used in an amount of from 5–50% by weight of the mixture of resins, but the preferred range is from 15–40% by weight of the resin mixture. In Example 3 hereinafter, a 25% urea-formaldehyde - 75% resinous polyepoxide weight ratio mixture is used, which shows preferred practice.

The aminoplast resin used to cure the epoxy resin is a simple, conventional, heat-hardening reaction product of a polyamine with enough formaldehyde to provide heat-hardening properties. It is preferred to use a resinous dimethylol urea condensate. These aminoplast resins provide N-methylol groups, and in this invention these groups are partially etherified with the 2-hexoxy ethanol. The remaining N-methylol groups may be unetherified or partly or wholly etherified with less volatile alcohols as stated previously. The 2-hexoxy ethyl ether modification of the aminoplast resin is believed to make the aminoplast resin less susceptible to hydrolysis when it is in the aqueous epoxy emulsion due to the increased hydrophobicity of the modified aminoplast. In addition, the use of 2-hexoxy ethanol in the aminoplast resin reduces the tendency of the resin to self-condense and to react prematurely with the epoxy group. It is believed that this is because when the 2-hexoxy ethanol is used for partial etherification, it adds primarily at the more reactive sites on the aminoplast resin. These characteristics help to retain the reactivity of the aminoplast resin until the emulsion is used, and this improves the cure of the epoxy-aminoplast system after prolonged storage providing better water and solvent resistance.

In this way, thermally curable aqueous epoxy emulsion coating compositions are provided which combine a good cure with extended cure stability. While storage at room temperature is intended, elevated temperatures may be encountered, and cure stability is also checked by testing at 120° F. Cure is tested by noting the pasteurization resistance of the cured film.

By using aqueous emulsion systems rather than organic solvent systems, the amount of solvent needed can be greatly reduced, thus reducing the cost, pollution, and hazard. The resin solids content used in the organic solvent solutions of this invention should be sufficient to dissolve the resins, but insufficient to enable normal coating application. In preferred practice, the solvent solution which is emulsified will contain the surfactant and a resin solids content in the range of 50–75%, preferably from 55–70%.

The invention is illustrated in the following Examples and Table.

EXAMPLE 1

To a five liter distilling flask equipped with an agitator, thermometer and vacuum distillation apparatus, charge 3200 grams of butylated urea-formaldehyde condensate solution containing 50% resin solids. In this example, the urea-formaldehyde condensate was obtained from Koppers Company under the trade designation Koprez 87-110. It is obtained as a solution in n-butanol/xylol at a 60/40 ratio. To the urea-formaldehyde resin solution add 800 grams of 2-hexoxy ethanol. Under agitation, the system is brought to equilibrium at 230 mmHg and heat applied. The temperature is allowed to increase to 110° C. and 800 grams of distillate are removed. The resultant resin solution has a composition of about 50 parts urea-formaldehyde resin, 33 parts n-butanol, 3 parts xylol and 14 parts 2-hexoxy ethanol. The solution has a viscosity of about 1000 cps as measured on a Brookfield viscometer at 80° F.

EXAMPLE 2

Example 1 is repeated except n-butanol is substituted for 2-hexoxy ethanol. This product has a final composition of about 50 parts urea-formaldehyde resin, 45 parts n-butanol and 5 parts xylol. The resin solution has a Brookfield viscosity of about 500 centipoise, measured at 80° F.

EXAMPLE 3

290 grams of a 69% solution of Epon 1007 (a diglycidyl ether of bisphenol A having an epoxide equivalent weight of 2000-2500, available from Shell Chemical Company) in 2-hexoxy ethanol has added thereto 27 grams of nonionic surfactant (see Note 1) to provide a surfactant-containing epoxy resin solution. To this surfactant containing epoxy resin solution are added 134 grams of the modified urea-formaldehyde condensate obtained from Example 1. This solution containing dissolved epoxy resin, dissolved urea-formaldehyde ether, and nonionic surfactant (the ratio of epoxy resin to urea-formaldehyde is about 75/25) is warmed to 50°–55° C. and mixed with water by slowly adding 549 grams of deionized water to the solution with constant agitation. During the addition process, the system inverts providing an oil-in-water emulsion in which the emulsified droplets contain the interreactive resins in intimate admixture.

It is possible to form two separate solutions, one for the epoxy and one for the urea-formaldehyde, and emulsify these separately to form separate emulsions which can be blended together. The result is that the two resins are not adequately mixed together, and the cured film suffers from this inadequate mixing. Thus, the use of separately formed emulsions is not satisfactory.

Note 1: Pluronic F 127 may be used which is a solid, poorly water soluble surfactant having a polyoxypropylene hydrophobe of molecular weight 4000 adducted with sufficient ethylene oxide to provide about 70% polyoxyethylene in the total molecule.

EXAMPLE 4

Example 3 is repeated except the modified amino resin from Example 1 is replaced with material obtained from Example 2. The resulting emulsion is substantially identical with the emulsion of Example 3 on initial admixture, but differences can be observed on storage as shown in the Table presented hereinafter.

EXAMPLE 5

Example 3 is repeated except the modified amino resin from Example 1 is replaced with the Koprez 87-110 as received from the supplier. Again the resulting emulsion is substantially identical with the emulsion of Example 3 on initial admixture but differences can be observed on storage as shown in the Table presented hereinafter and the differences develop more quickly than with either of the modified materials. One further problem encountered with the material from this example is that on extended storage of the solution at elevated temperature (3-5 weeks) films exhibit a grainy appearance.

The Table shows the results of coating the emulsion onto electrolytic tinplate and baking for 5 minutes at 350° F. to provide a coating weight of about 4.0 milligrams per square inch. The efficacy of the cure can be measured by solvent resistance and pasteurization resistance, but the latter is a more sensitive measure since differences can be seen in blush resistance before a difference in solvent resistance can be detected. The Pasteurization Test is a standard one carried out by subjecting the coating to water at 170° F. for 45 minutes. The tendency of the film to blush or delaminate is noted, but since no delamination difficulty was encountered, only blush resistance is reported in the Table. The results are reported on a scale of 0–10, 10 being perfect.

TABLE

BLUSH RESISTANCE

| | Example 5 (n-butanol ether as commercially supplied) | | Example 3 (2-hexoxy ethanol ether) | | Example 4 (n-butanol ether) | |
| --- | --- | --- | --- | --- | --- | --- |
| | Room Temp. | 120° F. | Room Temp. | 120° F. | Room Temp. | 120° F. |
| Initial | 10 | | 10 | | 10 | |
| 3 Days | 10 | 9 | 10 | 9+ | 10 | 9+ |
| 7 Days | 9+ | 8 | 10 | 9+ | 8 | |
| 10 Days | 9+ | 8 | 10 | 9 | 9+ | 8 |
| 21 Days | 9 | 8 | 9+ | 9 | 9 | 8 |
| 28 Days | 8 | 8 | 9+ | 9 | 8 | 8 |
| 57 Days | 7 | 7 | 9 | 9 | 8 | 8 |
| 84 Days | 7 | 7 | 9 | 7 | 8 | 6 |

The invention is defined in the claims which follow.

I claim:

1. A thermally curable aqueous emulsion coating composition comprising, as the discontinuous phase of the emulsion, liquid particles of a mixture of resinous polyepoxide and an aminoplast resin having N-methylol groups etherified with 2-hexoxy ethanol to an extent of at least 5%, said resins being dissolved in an essentially water immiscible organic solvent and a surfactant stably suspending said liquid particles in the aqueous continuum of the emulsion, said polyepoxide having a plurality of 1,2-epoxy groups and said aminoplast resin constituting from 5% to 50% by weight of the resin mixture.

2. An emulsion as recited in claim 1 in which said aminoplast is 2-hexoxy ethanol modified urea-formaldehyde resin.

3. An emulsion as recited in claim 1 in which said aminoplast is 2-hexoxy ethanol modified melamine-formaldehyde resin.

4. An emulsion as recited in claim 1 in which said aminoplast is 2-hexoxy ethanol modified benzoguanamine-formaldehyde resin.

5. An emulsion as recited in claim 1 in which said aminoplast is present in a range of from 15 to 40% by weight of resin mixture.

6. An emulsion as recited in claim 1 in which said surfactant is a nonionic surfactant present in an amount of from 0.5-20% by weight of the resin mixture.

7. An emulsion as recited in claim 1 in which the solvent solution which is emulsified contains a surfactant and has a resin solids content in the range of 50-75%.

8. An emulsion as recited in claim 2 in which butylated urea-formaldehyde resin is transetherified with 2-hexoxy ethanol.

9. An emulsion as recited in claim 1 in which said resinous polyepoxide has a molecular weight in the range of about 350 to about 8000.

10. An emulsion as recited in claim 9 in which the resinous polyepoxide is a solid diepoxide having a molecular weight in the range of about 400 to about 6000.

11. An emulsion as recited in claim 10 in which the resinous polyepoxide is a diglycidyl ether of a bisphenol having a 1,2-epoxy equivalency of about 1.4 to about 2.0.

* * * * *

UNITED STATES PATENT AND TRADEMARK OFFICE
CERTIFICATE OF CORRECTION

PATENT NO. : 4,043,963
DATED : August 23, 1977
INVENTOR(S) : RONALD W. ANDERSON

It is certified that error appears in the above-identified patent and that said Letters Patent are hereby corrected as shown below:

Column 5, Example 4 in the Table, the "8" under Room Temp. for 7 Days should be --9+--.

Signed and Sealed this

Twenty-first Day of February 1978

[SEAL]

Attest:

RUTH C. MASON
Attesting Officer

LUTRELLE F. PARKER
Acting Commissioner of Patents and Trademarks